Jan. 28, 1958     D. C. HEITSHU     2,821,059
HILLSIDE HARVESTER Filed April 1, 1954     5 Sheets-Sheet 1

INVENTOR.
D. C. HEITSHU

BY

ATTORNEYS

Jan. 28, 1958     D. C. HEITSHU     2,821,059
HILLSIDE HARVESTER Filed April 1, 1954     5 Sheets-Sheet 2

*INVENTOR.*
D. C. HEITSHU

ATTORNEYS

Jan. 28, 1958 D. C. HEITSHU 2,821,059
HILLSIDE HARVESTER
Filed April 1, 1954 5 Sheets-Sheet 3

INVENTOR.
D. C. HEITSHU
ATTORNEYS

Jan. 28, 1958   D. C. HEITSHU   2,821,059
HILLSIDE HARVESTER

Filed April 1, 1954   5 Sheets-Sheet 4

INVENTOR.
D. C. HEITSHU
ATTORNEYS

Jan. 28, 1958   D. C. HEITSHU   2,821,059
HILLSIDE HARVESTER
Filed April 1, 1954   5 Sheets-Sheet 5

INVENTOR.
D. C. HEITSHU
BY
ATTORNEYS

United States Patent Office 2,821,059
Patented Jan. 28, 1958

2,821,059

HILLSIDE HARVESTER

Daniel C. Heitshu, Moline, Ill., assignor to Deere & Company, Moline, Ill., a corporation of Illinois Application April 1, 1954, Serial No. 420,284

10 Claims. (Cl. 56—209)

This invention relates to a harvester and more particularly to a harvester having adjustable components enabling the harvester to operate on hillsides or other slopes transverse to the line of advance of the machine.

Hillside harvesters have long been known as specially designed machines used primarily in the Northwestern area of the United States for harvesting grain in hilly and mountainous areas. In the past, the basic type of machine comprised a longitudinal body drawn by a tractor and having a laterally outwardly extending header or platform. Means were provided for maintaining the level of the body while the wheels and header accommodated themselves to the transverse slope. The advent of the self-propelled harvester introduced many complications into the design of hillside harvesters and because of these complications many of the advantages of the self-propelled machine could not be utilized in the hillside machine. These problems arose primarily out of difficulty in coordinating the leveling of the body with the ability of the wheels and header to accommodate themselves to the slopes, which in turn gave rise to serious problems of stability and maneuverability.

The purpose of course of maintaining the level of the body while the wheels and header accommodate themselves to various angles is to retain the efficiency of the threshing mechanism, the various parts of which are designed for normal operation in planes parallel to the horizontal. In some cases this result is accomplished by allowing tilting of the body but leveling of the various threshing components. By far, the presently accepted method is to level the entire body, which result is accomplished by the provision of vertically adjustable wheels, normally of the individually suspended type that are thus capable of remaining in their respective vertical planes regardless of the height of one wheel relative to the other. Thus, on any particular slope, a line transverse to the line of travel and intersecting the centers of the wheels at the opposite sides of the body will be theoretically parallel to the transverse slope. Since the grain obviously grows on the same slope or on a slope not materially different from that traveled by the wheels, the header must occupy approximately the same transverse position. Rather than to allow the header merely to accommodate itself to the slope without some control thereover, it is desirable to connect the header and the wheels in such manner that the angle of the header is compelled to follow that of the wheels. This is one of the primary objects of the present invention.

Specifically, that object is achieved by the provision of a design in which the wheels are individually mounted and are cross-connected by a transverse rigid equalizer bar pivoted at its center to the longitudinal center line of the body and pivoted at its outer ends respectively to the wheels so that as one wheel moves up the other wheel moves down in an equal amount. The vertical movement of the equalizer bar is used to transmit controlling forces to the header. In a self-propelled machine of the type in which the header is pivoted directly to the body, either through the feeder house or by some other means, the control means will, according to the present invention, take the form of mechanical lever means or hydraulic means such as of a pair of hydraulic cylinders connected together in such manner that forces developed by vertical movement of the equalizer bar are hydraulically transmitted to the cylinder that is connected to the header.

In the case of the use of what is known as a ring joint as exemplified in the U. S. patent to Long 2,654,207, it is an object of the invention to connect the header control means to one of the ring parts.

It is a characteristic of self-propelled harvesters in general, and particularly those used as hillside machines, that the feeder house is pivoted to the harvester or combine body on a transverse axis for vertical movement in addition to movement permitted by the pivot on a longitudinal axis between the feeder house and the header. The present invention features header control means having a pivot substantially coaxial with the transverse pivot of the feeder house, whereby vertical movement of the feeder house relative to the body does not interfere with angular control of the header.

Further objects of the invention reside in the provision of novel wheel-mounting means, particularly in connection with a subframe that sustains the forward end of the machine; in the utilization of the subframe as a basis for the mounting of the equalizer; in the mounting on the subframe of a drive mechanism casing furnishing power to the front wheels, which are conventionally traction wheels; in the novel means for supporting hydraulic control means for the wheels; and in the provision of the wheel-mounting structure, which includes the subframe and the above related components, as a unit that may be readily attached to or demounted from a harvester of otherwise conventional design, whereby such conventional harvester may be easily converted to a hillside harvester.

The foregoing and other important objects and desirable features inherent in and encompassed by the invention will become apparent as a preferred embodiment of the invention, with specifically different forms thereof in some aspects, is disclosed in detail in the following specification and accompanying sheets of drawings, the several figures of which will be described immediately below.

Throughout this description the words "right" and "left" are used with reference to the position of an observer standing behind the machine and looking forwardly, it being understood that the header and large traction wheels are at the front of the machine and that the steerable wheels are at the rear of the machine. These terms, like the expressions "front," "rear," "top," "bottom," etc., are used primarily for the purposes of convenience and clarity and not as establishing any limits on the scope of the invention.

The general design of the machine is such as to produce a harvester having a longitudinal body 20 having front and rear ends 22 and 24 and carried at its front end at opposite sides thereof by right- and left-hand traction wheels 26 and 27 and at its rear end by an axle structure 28 having right- and left-hand steerable wheels 30 and 31. An upper forward portion of the body 20 carries a grain tank 32, which is generally conventional, ahead of which is an operator's station 34 having a steering wheel 36 for steering the wheels 30 and 31 and a seat 38 affording a vantage point for the operator.

The body 20 includes or carries, through the medium of a forwardly extending feeder house 40, a transverse platform or header 42. This header, as is conventional, is positioned transverse to the line of advance of the machine and is relatively long as measured between its right- and left-hand sides. The leading edge of the header, also as is conventional, has transverse cutting mechanism 44 with which a not unconventional reel 46 cooperates to cut the standing grain and to cause the grain to move rearwardly onto the header or platform whence it is conveyed by oppositely rotating right- and left-hand augers 48 and 49 to a central feed opening 50 that is formed in a rear upright transverse wall 52 of the header. The header construction, to the extent just described, may take other forms, that shown being only representative. The various details thereof are therefore not fully developed.

The front end of the main or separator body has a transverse wall 54 formed with a rectangular feed opening 56 (Fig. 4) through which grain cut by the header 42 is delivered to the interior of the body. Part of the threshing mechanism may be seen at 58 through the opening 56 as exposed in Fig. 4. The forward end of the feeder house 40 has an upright transverse marginal rim affording wall structure 60 in which is formed a feed opening 62 in register with the feed opening 50 of the header 42. In the present case, material fed through the registering openings 50 and 62 is conveyed upwardly and rearwardly within the feeder house by an endless conveyor 64, the forward end of which is carried on a transverse shaft 66 (Fig. 7) and the rearward end of which is carried on a transverse shaft 68 (Fig. 5). The rearward end of the conveyor 64 delivers, of course, directly into the body feed opening 56.

The transverse upper conveyor shaft 68 serves also as part of means for mounting the rear end of the feeder house 40 on the front end of the body 20 for movement about a transverse horizontal axis, which manner of mounting is generally conventional and need not be described in detail. For the present purposes, it will suffice to say that laterally outwardly projecting ends of the shaft 68 carry appropriate bearings (not shown) forming trunnions received respectively in right- and left-hand bearing members 70 and 71, which construction will be obvious from Figs. 1, 4 and 5. The pivotal connection of the feeder house to the body at 68—70—71 is such as to enable the feeder house to move vertically relative to the body, which movement enables not only vertical adjustment of the feeder house and header relative to the body but also a floating action of the feeder house and header as varying ground contour is encountered.

Figures 1, 7, 8, 9:
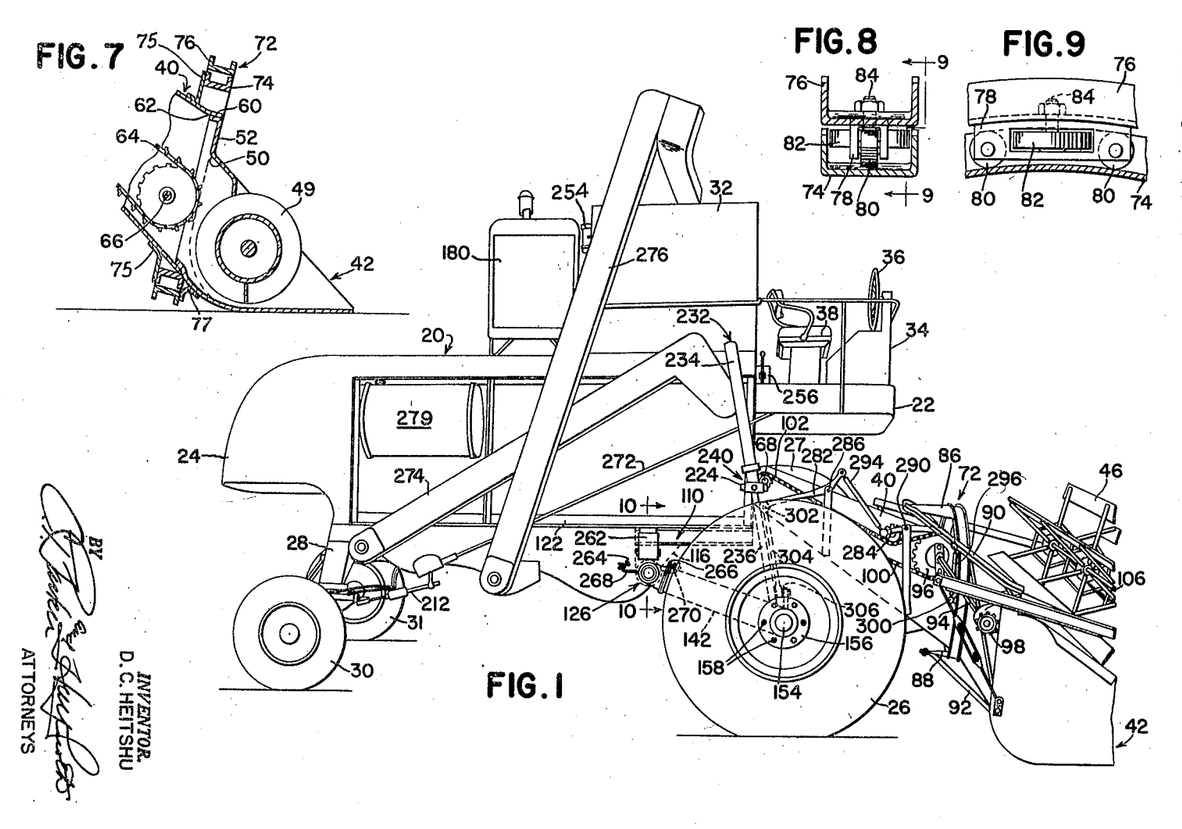
Fig. 1 is a perspective side view of the machine, with certain important parts illustrated in dotted lines.
Fig. 7 is a somewhat simplified transverse sectional view, on a somewhat reduced scale, as seen along the line 7—7 of Fig. 5.
Fig. 8 is an enlarged transverse sectional view showing one type of roller mounting that may be used between the inner and outer rings of Fig. 7.
Fig. 9 is a sectional view as seen substantially along the line 9—9 of Fig. 8.

Although the feeder house and header are interconnected for vertical movement in unison, they are connected also for relative movement about a generally longitudinal or fore-and-aft extending axis. This result is obtained in the present case by the provision of a swivel or pivot, designated in its entirety by the numeral 72 (see Figs. 1, 5 and 7) and comprising inner and outer rings 74 and 76 carried respectively by the proximate wall portions 60 and 52 of the feeder house 40 and header 42. The rings are substantially coplanar in a transverse upright plane and constitute interjournaled annular track means cooperative to establish the fore-and-aft pivot axis previously referred to, thus embodying in the present design the principal characteristic of the subject matter of the above-identified patent to Long. For present purposes, it is deemed sufficient to state that the inner ring 74 is rigidly mounted on the front portion of the feeder house 40, as by brackets 75, and that the ring 76 is rigidly carried by the rear upright wall 52 of the header 42, as by means 77. Each ring is preferably in the form of a channel and the inner ring is journaled relative to the outer ring by means of a plurality of angularly spaced roller means, the details of one of which are illustrated in Figs. 8 and 9. There are preferably four of these, spaced 90° apart about the circular track means 72. The outer ring or track 76 carries an arcuate support 78 in which are journaled two circumferentially spaced apart rollers 80. A third roller 82, carried by the ring section 76 on a vertical axis, as by a stud or shaft 84, rides one or the other of the upright flanges of the channeled ring 74, depending upon the direction of thrust. The rollers 80 ride the web of the track or ring 74.

Figures 2, 13, 14:
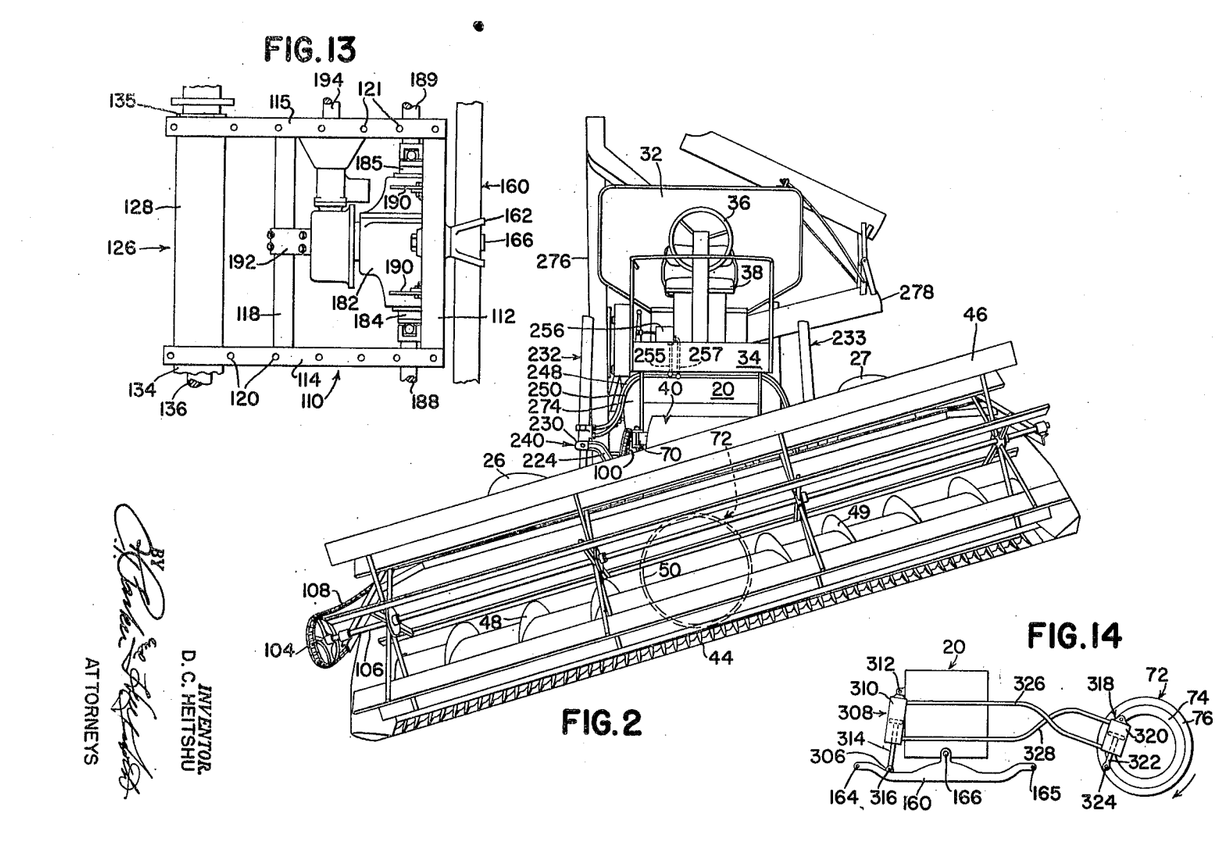
Fig. 2 is a front view of the machine shown in operation on a slope that inclines downwardly to the right of the machine.
Fig. 13 is a partial plan view of the structure shown in Fig. 6.
Fig. 14 is a schematic view of a modified form of header control means using a fluid system.

Not material to the present disclosure but described generally because illustrated is bracing structure connected between the outer ring 76 and the right- and left-hand ends of the header 42. As best shown in Fig. 5, upper and lower portions of the ring 76 carry rearwardly extending rigid arms 86 and 88, respectively, and laterally outwardly extending upper right- and left-hand braces 90 and 91 connect the upper bracket or arm 86 with outer ends of the header 42. Right- and left-hand lower braces 92 and 93 are symmetrically arranged with respect to the lower arm or bracket 88. Also visible in Fig. 5 is a reel-driving shaft 94 which is preferably of the telescopic type having at its inner end a sprocket 96 and at its outer end a sprocket 98 (Fig. 1). Fig. 1 shows how the sprocket 96 may be driven by a chain 100 from a sprocket 102 on the previously described upper conveyor shaft 68. Fig. 2 shows the connection between the outer sprocket 98 and a sprocket 104 on a central shaft 106 of the reel 46. The driving connection just described is effected by a chain 108, which chain has been omitted from Fig. 1.

From the description thus far, it will be apparent that the harvester advances over the ground in such manner as to move the header ahead of it. Because of the articulate connections at 68 and 72, the header may accommodate itself not only to varying ground contour lengthwise of the line of travel—moving about the pivot 68—but also may adapt itself to variations in the slope or angle of the ground transverse to the line of travel. Stated otherwise, the feeder house 40 and header 42 may move in unison about the pivot 68 relative to the body but the header may move relative to the feeder house about the longitudinal axis established by the ring joint or swivel 72. Because of the relationship of the registering openings, which surround the longitudinal pivot axis of the swivel joint 72, changes in the angular relationship between the header and the feeder house do not interfere with material transfer, all as pointed out in the above-identified patent to Long.

Articulation of the general character just referred to is material to the successful operation of a self-propelled hillside combine and the advantages to be gained from the specific design illustrated and described in detail are tremendous. However, it is difficult to achieve these advantages to the utmost without the coordination of properly designed wheel-mounting structure and header control means. These will be described immediately below in the order named.

Figures 3, 10:
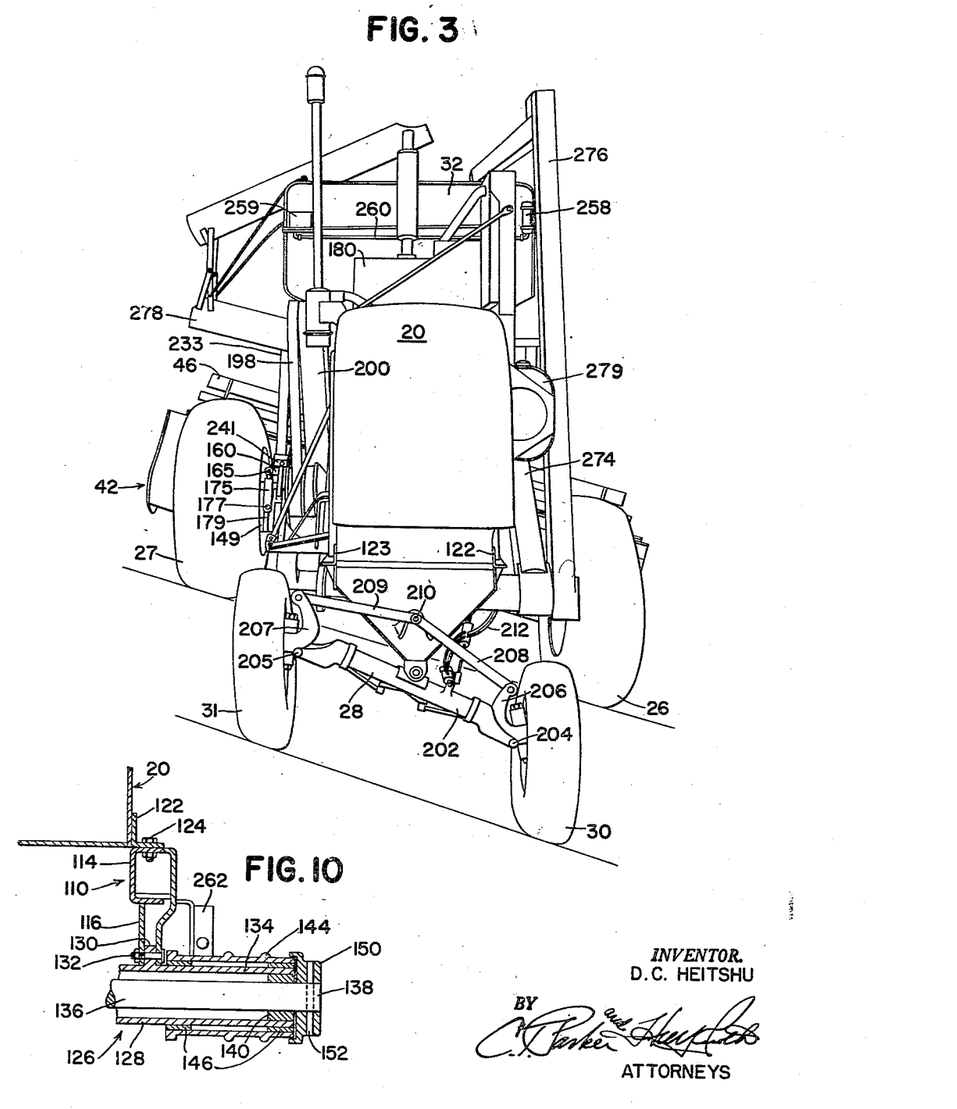
Fig. 3 is a rear view of the machine shown in Fig. 2.
Fig. 10 is an enlarged fragmentary sectional view as seen along the line 10—10 of Fig. 1.
Figures 4, 11, 12, 15:
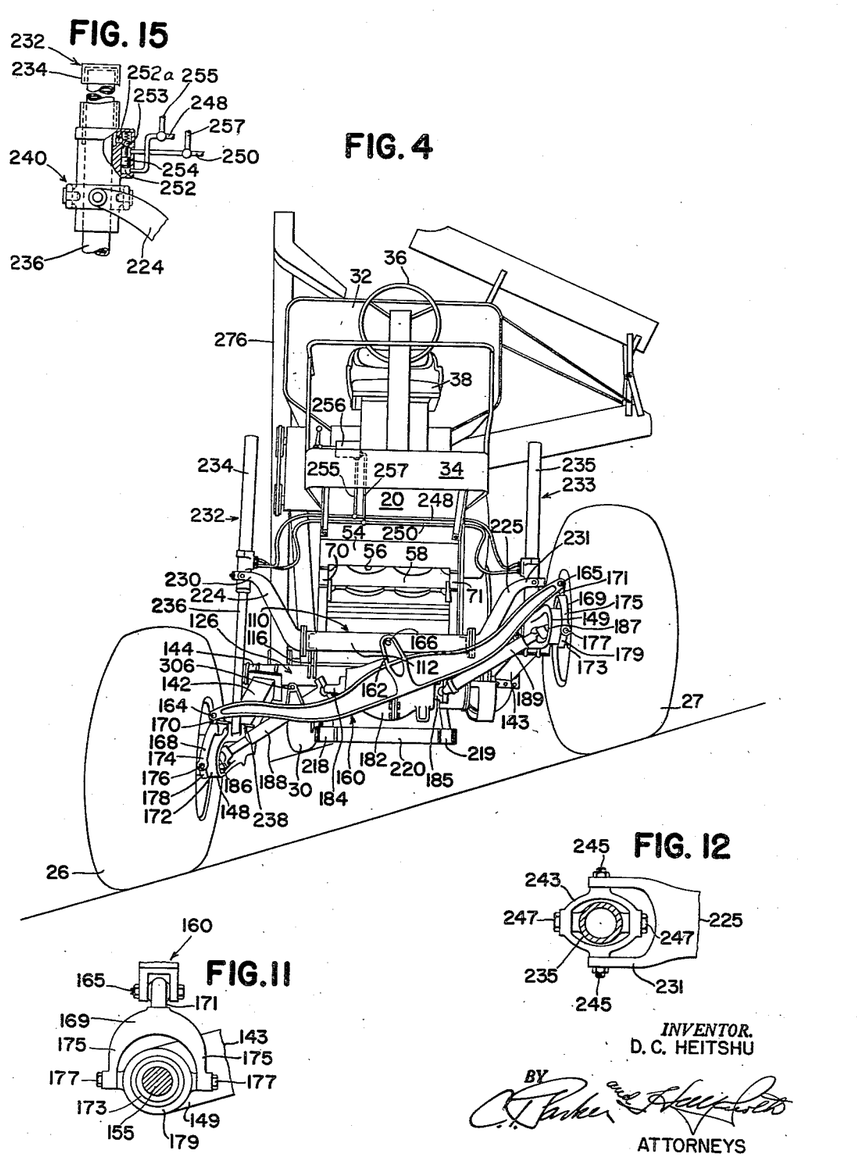
Fig. 4 is a front view similar to Fig. 2 but illustrating the machine with the header and feeder house removed.
Fig. 11 is a fragmentary sectional view as seen along the line 11—11 of Fig. 6.
Fig. 12 is a fragmentary transverse sectional view as seen along the line 12—12 of Fig. 6.
Fig. 15 is a view of the right-hand leveling motor, partly in section and drawn to a scale larger than that of Figs. 1, 2 and 4.
Figure 5:
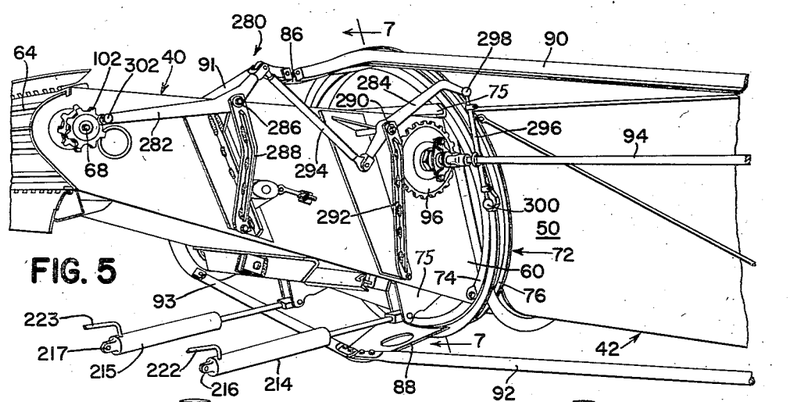
Fig. 5 is a perspective view on an enlarged scale showing the relationship between the intermediate portion of the header and the front portion of the feeder house.
Figure 6:
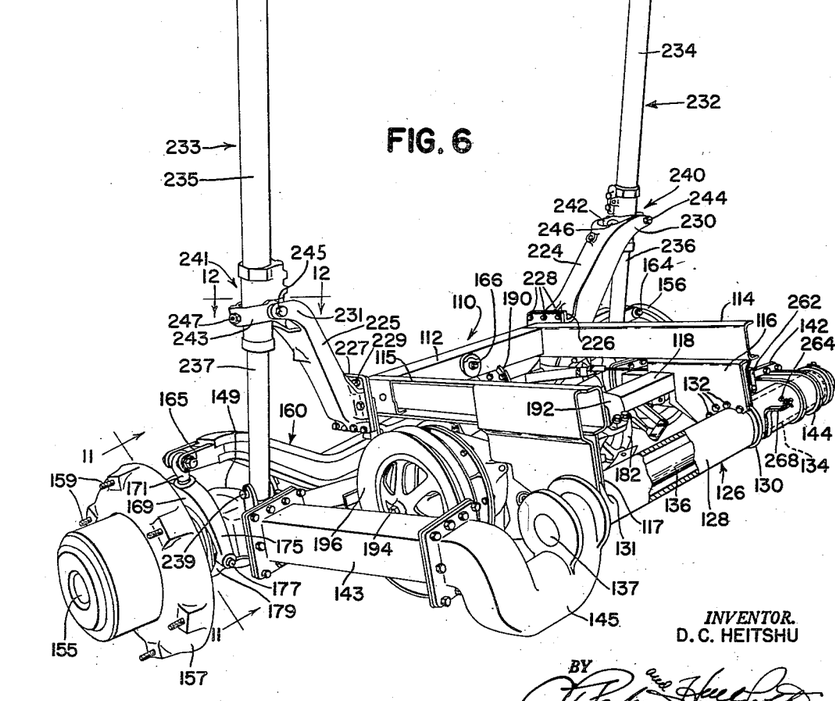
Fig. 6 is a perspective view showing the details of the subframe and wheel-mounting structure, parts of the tubular member being broken away to expose the inner shaft.

The wheel-mounting structure is best shown in Figs. 4 and 6, with details thereof emphasized in Figs. 10, 11, 12 and 13. Reference will be had first to Figs. 6 and 13, wherein there is illustrated a subframe, designated generally by the numeral 110, which serves as the basic mount for the front traction wheels 26 and 27. In its broader aspects, the invention contemplates the mounting of the wheels directly on the body by any type means, of which that shown in Fig. 6 is representative, but the Fig. 6 design is specifically advantageous as a unit construction enabling conversion of a conventional self-propelled harvester to a self-propelled hillside harvester.

The subframe 110 may be considered as of generally U-shape as viewed in plan, having a transverse cross member or bight 112 at its front end and a pair of opposite right- and left-hand longitudinal side members 114 and 115. These members are preferably of channel section to afford adequate strength and lightweight construction. The rear ends of the members 114 and 115 have rigidly connected respectively thereto depending supports or brackets 116 and 117 and are further cross-connected by a transverse intermediate member 118 relatively close to the rear ends of the side members. This gives the subframe tremendous structural strength and furthermore establishes the characteristic of unitary design by means of which the subframe may be readily mounted on or dismounted from the body 20. As shown in Fig. 13, the members 114 and 115 have a plurality of bolt-receiving apertures 120 and 121 therein. Opposite sides of the body 20 respectively have supporting members such as the angle iron shown at 122 in Figs. 1 and 10. Bolts, such as that shown at 124 in Fig. 10, may be used as means for securing the subframe to the body. Other means may, of course, be utilized; that shown is merely representative. A longitudinal angle 123 like the angle 122 appears at the left-hand side of the body in Fig. 3. Its association with the subframe will be obvious from the description of the connection at 122—114.

The rear end brackets 116 and 117 on the subframe 110 serve to carry a transverse journal member designated in its entirety by the numeral 126. This member or element comprises a rigid torque tube 128 having thereon integral right- and left-hand mounting flanges 130 and 131 removably but rigidly affixed respectively to the supports or brackets 116 and 117 as by bolts, some of which appear at 132 in Figs. 6 and 10. The torque tube 128 terminates at its left-hand end just to the left of the bracket 117, as shown at 135 in Fig. 13, but at its right-hand end includes an integral coaxial extension 134. This design enables the journaling in the torque tube 128 of a transverse shaft 136 which has its left-hand end 137 projecting beyond the left-hand support 117 and which has its right-hand end 138 extending slightly to the right and axially beyond the right-hand end extension 134 of the tube. The shaft 136 is journaled at its right-hand end 138 by any appropriate type of bearing, such as that shown at 140, in the right-hand extension 134 of the tube. A similar bearing (not shown) may journal the left-hand end of the shaft. Bearings in addition to those shown may be used, but the presence or absence thereof is immaterial here. In any event, the shaft 136 is rockable in the tube 128.

A right-hand fore-and-aft extending arm or member 142 has a transverse tubular portion 144 integral with the rear end thereof. This tubular portion is journaled, as by bearings 146, on the main tube extension 134, the arm extending forwardly alongside of the subframe to a front end portion 148 proximate to the inner face of the right-hand front traction wheel 26. A retainer 150 is secured by a pin 152 to the right-hand end 138 of the cross shaft 136. By this means, the wheel-supporting arm 142 is capable of movement in a vertical plane but it has no torque-transmitting connection to the cross shaft 136, as will be obvious from an examination of Fig. 10.

The retainer 150 also holds the shaft 136 against displacement to the left. The left-hand end 137 of the shaft 136 is keyed or otherwise rigidly fixed to a rear supporting part or end portion 145 of a left-hand fore-and-aft extending wheel-supporting arm 143 for the left-hand traction wheel 27. Except for the differences in the manner of mounting the rear ends 144 and 145 of the wheel-supporting arms 142 and 143, the two arms may be considered identical, or at least symmetrical. The arm 143 has its front end 149 proximate to the left-hand wheel 27. Consequently, the front ends of the arms 142 and 143 are in transverse alinement and the wheels 26 and 27, at least when level, are coaxial. Since the left-hand end 137 of the shaft 136 is rigidly connected to the rear end of the left-hand wheel-supporting arm 143 and since the right-hand end of the shaft is journaled in the right-hand extension 134 of the tube 128, without a rigid connection to the rear end of the right-hand wheel-supporting arm 142, the two arms are capable of vertical movement independently of each other. Stated otherwise, the shaft 136 is not a torque member between the two arms 142 and 143.

The right- and left-hand traction wheels 26 and 27 are driven respectively by reduction gearing (not shown) housed respectively in the forward portions 148 and 149 of the wheel-supporting arms 142 and 143 and respectively including wheel-connected shafts 154 and 155. Any suitable type of bearings (not shown here) may be utilized for journaling the respective shafts.

The right-hand wheel shaft 154 includes an outer end portion in the form of a wheel-mouting hub 156 (Figs. 1 and 6) having thereon a plurality of wheel-mounting studs 158 for carrying the traction wheel 26. Similar structure exists on the left-hand wheel shaft 155, the numeral 157 designating the hub and the numeral 159 designating the wheel-mounting studs for the left-hand wheel 27.

In order that the vertical movement of one of the wheels 26 or 27 may be translated equally but in an opposite direction to the other of the wheels, the present invention features equalizer means preferably in the form of a transverse rigid equalizer bar 160 having a central portion comprising an integral mounting ear 162 and opposite ends including right- and left-hand longitudinal pivots 164 and 165 respectively. The ear 162 is pivotally connected to the subframe 110 on the longitudinal center line of the machine, this pivot being effected by a fore-and-aft pivot member 166 supported at the central portion of the front cross member 112 of the subframe 110. The opposite ends of the equalizer 160 are connected respectively via 164 and 165 to the front ends 148 and 149 of the wheel-supporting arms 142 and 143. The right-hand connecting means comprises a yoke 168 having an upper leg 170 connected to the right-hand end of the equalizer by a pivot or joint at 164 on a fore-and-aft axis spaced above the axis of the wheel shaft 154. A similar yoke 169 effects the connection at the left-hand end of the equalizer 160 to the left-hand arm 143, and this yoke includes an upper member 171 connected to the left-hand end of the equalizer 160 by a ball joint at 165, which joint includes multiple pivot axes spaced above the left-hand wheel shaft 155. The details of the connection are best shown for the left-hand wheel in Fig. 11, wherein it is clear that the forward end portion 149 of the wheel-supporting arm 143 is cylindrical, as at 173, and this cylindrical portion or sleeve is embraced by a pair of depending legs 175 of the yoke 169. These legs are pivotally connected at 177 on a common fore-and-aft axis to a ring 179 journaled on the sleeve 173, which establishes a pivot joint spaced below the joint at 165.

That the construction at the right-hand side is at least symmetrical may be visualized from Fig. 4, where it may be seen that the yoke 168 has legs 174 pivotally joined at 176 to a ring 178 that is journaled on a cylindrical portion or sleeve 172 of the forward portion 148 of the right-hand wheel-supporting arm 142.

As the wheels 26 and 27 move vertically but in opposite directions, they sustain the weight of the front end of the machine by means of the equalizer 160 and the wheel-supporting arms 142 and 143. Since the axis of each wheel travels in an arc about the transverse journal 126 as the wheel oscillates and since the proximate end of the equalizer moves in an arc about the pivot 166, it will be appreciated that there is bound to be some conflict between the front end of the wheel-supporting arm 142 and the right-hand end of the equalizer 160, so far as concerns the fact that these two members move in planes normal to each other. However, this conflict is resolved by the provision of the connecting means comprising the yoke 168 and its components and the pivot or joint 164. The same is true at the left-hand connection 165—169. That is to say, the several axes afforded by 164, 176 and that accomplished by journaling of the ring 178 on the cylindrical portion or sleeve 172 of the front end of the arm 142 permit the equalizer 160 and arm 142 to move in their respective planes without subjection to undesirable forces. Of course, similar results are obtained at the other side of the machine, all of which will be clear without further elaboration.

The self-propelled characteristic of the machine is introduced by the provision of a power source, here in the form of an internal combustion engine 180 mounted behind the grain tank 32, which engine furnishes power for driving the traction wheels 26 and 27 as well as for driving the various components of the threshing and harvesting mechanism. For the purpose of transmitting drive to the wheels 26 and 27, the machine carries at its front end, preferably via the subframe 110, a drive mechanism casing 182 which contains appropriate drive gearing (not shown) for transmitting power equally to right- and left-hand driving or output shafts 184 and 185. The right-hand wheel-driving shaft 154 has an inner portion, barely visible at 186 in Fig. 4, and a similar inner portion 187 is also visible in Fig. 4 for the left-hand wheel-driving shaft 155. The driving and driven shafts 184 and 186 are drivingly interconnected by flexible and telescopic shafting indicated generally by the numeral 188, the details of which will be apparent without elaboration. A similar flexible and telescopic shaft 189 interconnects the driving and driven shafts 185 and 187 at the left-hand side of the machine. Because of the flexible shafting at 188 and 189, oscillation of the wheels 26 and 27 may occur without affecting the drive.

The drive mechanism casing 182 is supported by the subframe through the medium of front and rear hangers 190 and 192 mounted respectively on the subframe front cross member 112 and the subframe intermediate cross member 118. Thus, the drive mechanism casing is an integral part of the unit assembly comprised in the subframe.

The drive mechanism casing has an input shaft 194 to which is keyed an input sheave 196. The sheave 196 is driven in any suitable manner from the internal combustion engine 180, which means is not shown here but which may take the form of that shown in the U. S. Patent to Anderson 2,510,325. A driving belt between the engine and the sheave 196 is visible at 198 in Fig. 3. A wider and flat belt 200 is also visible in Fig. 3. This belt establishes drive from the engine 180 to the threshing mechanism, a detail that need not be elaborated since it is not unconventional.

The wheels 30 and 31, in addition to being steerable, are also interconnected for vertical movement respectively in opposite directions. For this purpose, the rear axle 28 comprises a transverse beam 202 having pivoted thereto respectively at its right- and left-hand ends, at 204 and 205, left- and right-hand knuckles 206 and 207, which knuckles have their upwardly extending arms connected by tie links 208 and 209 to a common pivot 210 on the longitudinal center line of the machine. These details, to the extent described, are illustrated in Fig. 3. Also appearing in that figure are portions of hydraulic steering means, which means forms no part of the present invention but is designated generally, to the extent shown, by the numeral 212 merely to explain its presence in the drawings (see also Fig. 1).

The feeder house and header were previously described as being adjustable in unison about the transverse horizontal pivot at 68. This adjustment is accomplished by power and under control of the operator by means of right- and left-hand fluid motors 214 and 215, normally connected between the subframe 110 and the header 42, but demountable with the header as shown in Fig. 5. The cylinder of the right-hand motor 214 has thereon a clevis 216 and the cylinder of the motor 215 has a similar clevis 217. These clevises are connectible in any suitable manner to right- and left-hand brackets 218 and 219 fixed to a transverse support 220 carried by the subframe 110 (Fig. 4). Fluid conduits 222 and 223 lead respectively to the motors 214 and 215 and these may transmit fluid from any suitable fluid source (not shown) on the machine, the details of which are not material here.

Another feature of the invention is the provision of power means for causing the traction wheels 26 and 27 to move vertically but in opposite directions. A subsidiary phase of this aspect of the invention is the provision of a pair of rigid supports, preferably unitarily associated with the subframe 110 for carrying part of this power means. Such supports are shown as comprising right- and left-hand mounting brackets 224 and 225. The right-hand bracket has a flanged inner end 226 secured, as by cap screws 228, to a forward portion of the subframe 110. The left-hand support 225 is similarly flanged at 227 and secured to the opposite side of the subframe 110 by cap screws 229.

The right-hand bracket or support 224 extends upwardly and laterally and has a bifurcated or forked outer end 230 overhanging or spaced above the front end portion of the right-hand wheel-carrying arm 142. The left-hand support has a similar outer end 231 symmetrically associated with the left-hand wheel-carrying arm 143. The outer ends 230 and 231 of the supports or brackets 224 respectively carry right- and left-hand fluid motors 232 and 233, the former comprising a cylinder 234 and piston rod 236 and the latter comprising a cylinder 235 and piston rod 237. The lower end of the right-hand piston rod 236 is pivotally connected, as at 238 (Fig. 4), to the front end of the wheel-carrying arm 142. The lower end of the piston rod 237 of the left-hand motor 233 is pivotally connected, as at 239 (Fig. 6), to the front end of the left-hand arm 143. The cylinders 234 and 235 are respectively connected to the bifurcated ends 230 and 231 of the supports 224 and 225 by flexible joint means, designated generally and respectively by the numerals 240 and 341. The details of the left-hand joint 241 are shown in Fig. 12, from which it will be seen that the lower end of the cylinder 235 is encircled by a ring-like member 243 having a pair of coaxial pivotal connections 245 with the furcations of the support end 231 and a pair of coaxial pivotal connections 247 with the cylinder 235. The axis of the pivots 245 is normal or at right angles to the axis of the pivots 247, thus producing, in effect, a universal joint. Corresponding details of the right-hand joint 240 will be appreciated from Fig. 6, wherein a ring-like member 242 is shown as having a pivotal connection 244 with the bifurcated end 230 of the support 224. The numeral 246 represents a pivot axis corresponding to the pivot 247. This type of joint, as to each side of the machine, permits free vertical movement of the associated wheel and wheel-carrying arm, taking into consideration the fact that the front end of the arm, and consequently the wheel, swings in an arc, whereas the movement of the piston 236 in the cylinder 234, for example, is necessarily straight-line movement. Nevertheless, as already stated, the manner of articulately connecting the motor 232 to the support 224 and to the front end of the wheel-carrying arm 142 adequately accommodates the arcuate travel of the wheel in such manner that there is no interference with free vertical movement. The same results obtain, of course, at the left-hand side of the vehicle.

Each of the hydraulic or fluid motors 232 and 233 is of the single-acting type supplied with fluid via cross lines 248 and 250 and alternate supply and return lines 255 and 257 and a control valve 256. Any type of system may be used to satisfy the broad aspects of the invention. The details of the system disclosed here are therefore to be considered only representative. Moreover, since the motors 232 and 233 may be identical, a detailed illustration of the right-hand motor is deemed sufficient for both.

Fig. 15 shows that the lower end of the right-hand motor is enlarged to accommodate a fluid chamber 252 under the control of a spring-loaded check valve 253 and a fluid-actuated plunger 254. The right-hand ends of the lines 248 and 250 are crossed and enter the chamber 252 respectively below and above the plunger 254, and the upper end of the chamber 252 leads to the interior of the cylinder 234 via a passage 252a. The left-hand ends of the lines 248 and 250 enter the left-hand chamber (not shown) respectively above and below the left-hand plunger (also not shown); i. e., the left-hand ends of the lines 248 and 250 are reversed as respects the right-hand ends.

The lines 255 and 257 are alternately supply and return lines, depending upon positioning of the valve 256. For example, if that valve is actuated to supply fluid to the line 250 via 257, that fluid enters the chamber 252, forces the plunger 254 down and opens the check valve 253 to enter the interior of the cylinder 234 via 252a. Fluid in the line 250 cannot enter the left-hand cylinder 235, because the left-hand end of the line 250 is connected below the left-hand plunger (not shown) and the result is that the left-hand check valve (not shown) is positively opened to allow fluid displaced by the piston in the left-hand cylinder to return to the valve 256 via 248 and 257; and such fluid cannot enter the right-hand chamber 252, because the plunger 254 has been forced down as aforesaid. When the valve 256 is actuated to supply fluid to the line 248 via 255, the opposite results are achieved, which is not inconsistent with vertical movement of the wheels 26 and 27 in opposite directions because of the equalizer 160. Although operation of the valve 256 may be effected manually, it is preferred that its actuation be accomplished automatically. Since there are many types of automatic controls and since that illustrated only generally in the present disclosure is not per se a part of the present invention, there is no need for elaboration. Suffice it to say that the automatic control is based on the principle of the variation in the head or height of fluid which is variable according to the transverse slope or angle of the field traversed by the machine.

In Fig. 3, the numeral 258 represents a right-hand fluid container and the numeral 259 illustrates a left-hand fluid container. These are cross-connected by a fluid line 260 and as long as the body 20 of the machine remains level there will be theoretically no variation in the fluid level and accordingly the wheel-adjusting motors 232 and 233 will not be actuated. As already indicated, these details are unimportant in the present instance and the characteristics thereof to the extent described and shown are merely representative, since the subject matter forms the basis of assignee's copending application, Serial No. 430,338, filed May 17, 1954.

Part of the automatic control means for the wheel-adjusting motors 232 and 233 includes an electrical control box 262 influenced by stops 264 and 266 carried respectively on arms 268 and 270 that are supported on the pivoted end of the right-hand wheel-supporting arm 142. The means just described (262—264—266—268—270) operates as a safety device for cutting out the hydraulic system as by electrically neutralizing the valve 256 to prevent further operation of the motors 232 and 233, when the wheel-supporting arm 142 has reached its maximum angle relative to the body 20 when pivoting relative to the body about the transverse journal member 126. Again, these details are unimportant in the present case and are described only to orient them with the remainder of the structure.

Additional structure that may require explanation on the basis of its illustration in the drawings will now be briefly described, it being understood that these details are likewise unimportant. For example, the numeral 272 represents generally a mechanical connection between the steering wheel 36 and hydraulic steering mechanism 212. A tailings conveyor 274 of conventional structure and function is shown, as is a tank-loading conveyor 276, the latter leading to the grain tank 32. This tank may be unloaded by any conventional form of unloading conveyor, as represented generally by the numeral 278. A fuel tank appears at 279.

Still another feature is the means for controlling the header in response to vertical movement of the wheels 26 and 27. This means is best shown in Figs. 1, 4 and 5, with a modified form being shown in Fig. 14. The form shown in Figs. 1, 4 and 5 will be described first.

The header control means just referred to is indicated in its entirety by the numeral 280 (Fig. 5) and is in the form of mechanical lever means comprising a first lever or bell crank 282 and a second lever or bell crank 284. The lever 282 is pivoted intermediate its ends at 286 on a suitable bracket 288 secured to the right-hand side of the feeder house 40 intermediate the front and rear ends thereof. In the absence of the feeder house, the bracket 288 would be secured directly to the body 20. The front lever or bell crank 284 is pivoted intermediate its ends at 290 on a bracket 292 secured to the right-hand side of the feeder house 40 just ahead of the bracket 288 and in proximity to the ring joint 72. A link 294 is pivotally connected at its opposite ends respectively to the front arm of the lever 282 and the rear arm of the lever 284.

The lever means comprising the levers 282 and 284 and link 294 is connected to the header 42, preferably by means of a vertical link 296 that has its upper end pivotally connected at 298 to the forward arm of the lever 284, said link having its lower end pivotally connected at 300 to the outer ring 76 of the ring or swivel joint 72. Since the means 280 is at the right-hand side of the feeder house 40, it follows that the pivotal connection 300 is spaced laterally from the longitudinal pivot axis of the ring joint 72. Consequently, when the lever means is operated, there is an effective moment arm between the axis of the ring joint 72 and the point 300.

The rear arm of the rear lever 282 has a rear end portion 302 proximate to and at times in axial alinement with the feeder house pivot 68, the purpose served here being to eliminate conflict among the pivots and to maintain constant the relationship of the header to the ground regardless of vertical adjustment of the feeder house and header in unison about the pivot axis at 68. The lever means 280 derives force from vertical movement of the wheels 26 and 27, in this case the force-transmitting means comprising a vertical link 304 having its upper end connected to the rear end 302 of the lever 282 and having its lower end pivotally connected to an upstanding ear or lug 306 rigid on the right-hand end of the transverse equalizer bar 160. The joints at 302 and 306 are preferably ball joints so that oscillation, rocking and other movement of the various parts is free from binding or other interference.

As the wheels 26 and 27 move vertically to accommodate themselves to a transverse slope, the equalizer 160 of course moves vertically, the ends respectively proximate to the wheels partaking generally of the movement of the wheels; that is, as to direction. For example, as the right-hand wheel moves up or down, the right-hand end of the equalizer 160 moves accordingly and force is derived from this movement via the link 304. Thus, when the right-hand end of the equalizer 160 moves upwardly in accordance with upward movement of the right-hand wheel 26, the link 304 operates in compression to exert an upward force on the rear end of the lever 282. This causes the lever 282 to rock in a clockwise direction (Figs. 1 and 5) and causes a counterclockwise rocking of the front lever 284. The front link 296, that is connected between the front end of the front lever 284 and the outer ring 76 of the joint 72, thus pulls upwardly on the ring 76. Since the ring 76 is rigid on the header 42, this causes the right-hand end of the header to move upwardly and remain generally parallel with a line intersecting the axes of the wheels 26 and 27. Therefore, the header is compelled to adapt itself to the same slope as the wheels 26 and 27.

In the modified form of header control means shown in Fig. 14, hydraulic means is substituted for the mechanical means just described. A hydraulic cylinder and piston assembly 308 has a cylinder 310 pivotally connected at 312 to the combine body 20 and a piston including a piston rod 314 pivotally connected at 316 to the ear or lug 306 on the equalizer 160. A second cylinder and piston assembly 318 has a cylinder 320 connected to the inner ring 74 of the joint 72 and a piston including a piston rod 322 pivotally connected at 324 to the outer ring 76. Crossed fluid lines 326 and 328 respectively and oppositely connect the upper and lower ends of the cylinder and piston assemblies 308 and 318 so that when the right-hand end of the equalizer 160 moves upwardly, for example, fluid expelled from the upper end of the cylinder 310 is transmitted to the lower end of the cylinder 320, rotating the outer ring 76 (and consequently the header affixed thereto) in a clockwise or upward direction as viewed in Fig. 14. When the right-hand end of the equalizer moves downwardly, the reverse result is obtained. Proper appraisal of Fig. 14 will follow the realization that the view is diagrammatic and it should be assumed that the pivot 166 and the common axis of the rings 74 and 76 lie in the same fore-and-aft upright plane as in Figs. 2 and 4, for example.

Operation

When the machine is operated on perfectly level ground, the wheels 26 and 27, as well as the wheels 30 and 31 with respect to each other, will be coaxial and the header 42 will be parallel to the ground and parallel to the axis of the wheels 26 and 27. As soon as the machine approaches a slope that is transverse to the line of travel, the entire machine tends to accommodate itself to that slope, but as soon as the body tilts, the automatic control means including the fluid containers 258 and 259 and cross-connecting line 260 become effective to operate the wheel-adjusting motors 232 and 233 and cause these motors to extend and contract in an appropriate manner. For example, if the tendency of tilt is toward the right-hand side of the machine as illustrated, fluid under pressure will be supplied to the right-hand motor 232 to cause that motor to extend, simultaneously incurring contraction of the left-hand motor in the manner previously described. Since the cylinders of these motors are connected to the body by means of the supports or brackets 224 and 255 and since the pistons are connected to the wheel-carrying arms 142 and 143, the result of operation of the motors is to rock the body generally about a longitudinal horizontal axis until the body reaches a level position, which position will be appreciated by the automatic means which in turn will then discontinue the supply of fluid to the motors 232 and 233. As the wheels 26 and 27 move vertically in opposite directions to accommodate the transverse slope, the equalizer 160 maintains a proportionate amount of travel of the wheels in such vertical directions, thus tying the wheels together to obtain maximum uniform results. Since the equalizer controls the header through the control means 280 or that illustrated in Fig. 14, the header is compelled to accommodate itself to the same slope. Leveling of the body as the wheels encounter variations in the transverse slope automatically follows as the machine advances. As stated above, the particular type of automatic control means is not material here, but what is material is the equalizer means between the traction wheels 26 and 27 and the utilization of that means for controlling the header 42. Additional features reside, as already outlined, in the subframe, the manner of mounting the subframe on the body and the manner in which the several components of the equalizer, drive mechanism, motor supports 224 and 225, etc. are carried by the subframe.

Various other features and advantages of the invention not specifically enumerated herein will undoubtedly occur to those versed in the art, as likewise will many modifications and alterations in the preferred embodiments of the invention illustrated, all of which may be achieved without departing from the spirit and scope of the invention.

What is claimed is:

1. Header control means for a hillside harvester of the type including a longitudinal body supported by transversely spaced wheel means relatively vertically adjustable in opposition and a header supported on the body for angular movement relative to the body generally about a longitudinal axis, said header control means comprising: longitudinal lever means fulcrumed on the body intermediate the wheels and the header and having first and second portions spaced apart longitudinally and respectively positioned adjacent to one of the wheel means and to the header; first force-transmitting means connecting the first portion of the lever means to the one wheel means to impart motion to said lever means in response to vertical adjustment of said one wheel means; and second force-transmitting means connecting the second lever means portion to the header for transmitting motion of said lever means to the header.

2. Header control means for a hillside harvester of the type including a longitudinal body supported by transversely spaced wheel means relatively vertically adjustable in opposition and having a feeder house carried by the body and projecting forwardly ahead of the wheel means and a transverse header supported on the front of the feeder house by means of cooperative concentric track members carried respectively by the feeder house and header and interjournaled for relative angular movement generally about a longitudinal axis, said header control means comprising: longitudinal lever means fulcrumed on the feeder house intermediate the wheel means and the header and having first and second portions spaced apart longitudinally and respectively positioned adjacent to one of the wheel means and to the header; first force-transmitting means connecting the first portion of the lever means to the one wheel means to impart motion to said lever means in response to vertical adjustment of said one wheel means; and second force-transmitting means connecting the second lever means portion to the header track member for transmitting motion of said lever means to the header.

3. Header control means for a hillside harvester of the type including a longitudinal body supported by transversely spaced wheel means relatively vertically adjustable in opposition and a header supported on the body for angular movement relative to the body generally about a longitudinal axis, said header control means comprising: a transverse equalizer pivoted intermediate its ends to the body on a longitudinal axis and connected at its opposite ends respectively to the wheel means for rocking in a transverse vertical plane as the wheel means are adjusted vertically; longitudinal lever means fulcrumed on the body intermediate the wheel means and the header and having first and second portions spaced apart longitudinally and respectively positioned adjacent to one of the wheel means and to the header; first force-transmitting means connecting the first portion of the lever means to the equalizer to impart motion to said lever means in response to vertical rocking of said equalizer and second force-transmitting means connecting the second lever means portion to the header for transmitting motion of said lever means to the header.

4. Header control means for a hillside harvester of the type including a longitudinal body supported by transversely spaced wheel means relatively vertically adjustable in opposition and a header supported on the body for angular movement relative to the body generally about a longitudinal axis, said header control means comprising: a transverse equalizer pivoted intermediate its ends to the body on a longitudinal axis and connected at its opposite ends respectively to the wheel means for rocking in a transverse vertical plane as the wheel means are adjusted vertically; and articulated lever and linkage means interconnecting the equalizer and the header for transmitting motion of the equalizer to the header.

5. Header control means for a hillside harvester of the type including a longitudinal body supported by transversely spaced wheel means relatively vertically adjustable in opposition, a feeder house pivoted to the body on a transverse axis and a header supported on the body for angular movement relative to the body generally about a longitudinal axis, said header control means comprising: longitudinal lever means fulcrumed on the feeder house and having first and second portions spaced apart longitudinally and respectively positioned adjacent to one of the wheel means and to the header; first force-transmitting means connecting the first portion of the lever means to the one wheel means to impart motion to said lever means in response to vertical adjustment of said one wheel means; and second force-transmitting means connecting the second lever means portion to the header for transmitting motion of said lever means to the header.

6. The invention defined in claim 5, in which: the first force-transmitting means includes a pivotal connection to the first lever portion generally in alinement with the transverse axis of the feeder house-to-body pivot.

7. Header control means for a hillside harvester of the type including a longitudinal body supported by transversely spaced wheel means relatively vertically adjustable in opposition, a feeder house pivoted to the body on a transverse axis and a header supported on the body for angular movement relative to the body generally about a longitudinal axis, said header control means comprising: a transverse equalizer pivoted intermediate its ends to the body on a longitudinal axis and connected at its opposite ends respectively to the wheel means for locking in a transverse vertical plane as the wheel means are adjusted vertically; longitudinal lever means fulcrumed on the feeder house and having first and second portions spaced apart longitudinally and respectively positioned adjacent to one of the wheel means and to the header; first force-transmitting means connecting the first portion of the lever means to the equalizer to impart motion to said lever means in response to vertical rocking of said equalizer; and second force-transmitting means connecting the second lever means portion to the header for transmitting motion of said lever means to the header.

8. The invention defined in claim 7, in which: the first force-transmitting means includes a pivotal connection to the first lever portion generally in alinement with the transverse axis of the feeder house-to-body pivot.

9. Header control means for a hillside harvester of the type including a longitudinal body supported by transversely spaced wheel means relatively vertically adjustable in opposition and including a feeder house projecting forwardly from the body and supporting a header for angular movement relative to the feeder house generally about a longitudinal axis, said header control means comprising: a transverse equalizer disposed rearwardly of the header and pivoted intermediate its ends to the body on a longitudinal axis and connected at its opposite ends respectively to the wheel means for rocking in a transverse vertical plane as the wheel means are adjusted vertically; and fore-and-aft means interconnecting the equalizer and the header for transmitting motion of the equalizer to the header.

10. Header control means for a hillside harvester of the type including a longitudinal body supported by transversely spaced wheel means relatively vertically adjustable in opposition and a header supported on the body for angular movement relative to the body generally about a longitudinal axis, said header control means comprising: a transverse equalizer pivoted intermediate its ends to the body on a longitudinal axis and connected at its opposite ends respectively to the wheel means for rocking in a transverse vertical plane as the wheel means are adjusted vertically; lever means fulcrumed on the body intermediate the wheel means and the header and having first and second portions; first force-transmitting means connecting the first portion of the lever means to the equalizer to impart motion to said lever means in response to vertical rocking of said equalizer and second force-transmitting means connecting the second lever means portion to the header for transmitting motion of said lever means to the header.

References Cited in the file of this patent

UNITED STATES PATENTS

| | | |
|---|---|---|
| 1,255,599 | Gross | Feb. 5, 1918 |
| 1,463,515 | Long | July 31, 1923 |
| 1,941,143 | Wickersham | Dec. 26, 1933 |
| 2,510,325 | Anderson | June 6, 1950 |
| 2,564,202 | Hanson | Aug. 14, 1951 |
| 2,607,610 | Allison | Aug. 19, 1952 |
| 2,654,207 | Long | Oct. 6, 1953 |
| 2,656,668 | Witzel | Oct. 27, 1953 |
| 2,709,329 | Neal | May 31, 1955 |
| 2,753,675 | Harp | July 10, 1956 |
| 2,780,903 | Kroll et al. | Feb. 12, 1957 |

FOREIGN PATENTS

| | | |
|---|---|---|
| 379,926 | Germany | Sept. 1, 1923 |